(12) United States Patent
Findlater et al.

(10) Patent No.: US 7,031,333 B1
(45) Date of Patent: **\*Apr. 18, 2006**

(54) REDUCED PIN COUNT MEDIA INDEPENDENT INTERFACE

(75) Inventors: Stewart Findlater, Mountain View, CA (US); James R. Rivers, Saratoga, CA (US); David H. Yen, Palo Alto, CA (US); Brian Petersen, San Jose, CA (US)

(73) Assignee: Cisco Technology, Inc., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 09/089,312

(22) Filed: Jun. 2, 1998

(51) Int. Cl.
*H04J 3/00* (2006.01)

(52) U.S. Cl. ............ 370/419; 370/439; 370/442; 370/463; 370/498; 370/537

(58) Field of Classification Search ............ 370/442, 370/458, 461, 462, 463, 498, 263, 439, 465, 370/501, 503, 260, 229, 350, 347, 402, 537, 370/512, 414, 419, 401; 375/211, 222, 229, 375/260
See application file for complete search history.

(56) References Cited

U.S. PATENT DOCUMENTS

| | | | |
|---|---|---|---|
| 4,748,621 A \* | 5/1988 | Ballance et al. | 370/307 |
| 4,761,800 A \* | 8/1988 | Lese et al. | 370/468 |
| 5,099,473 A | 3/1992 | Gupta et al. | 370/434 |
| 5,243,350 A \* | 9/1993 | Vasile et al. | 342/157 |
| 5,469,434 A | 11/1995 | Kurdzo et al. | |
| 5,535,398 A \* | 7/1996 | Biggs et al. | 713/324 |
| 5,568,470 A | 10/1996 | Ben-Nun et al. | 370/238 |
| 5,636,140 A | 6/1997 | Lee et al. | 370/469 |
| 5,715,287 A | 2/1998 | Wadhawan et al. | 375/377 |
| 5,754,540 A \* | 5/1998 | Liu et al. | 709/315 |
| 5,790,786 A \* | 8/1998 | Wakeman et al. | 395/200.02 |
| 5,835,728 A | 11/1998 | Shinomiya et al. | 709/242 |
| 5,856,979 A | 1/1999 | Vogel et al. | 370/503 |

(Continued)

OTHER PUBLICATIONS

RMII Consortium, "RMII Specification," (Mar. 20, 1998).

*Primary Examiner*—Dang Ton
*Assistant Examiner*—Shick Hom
(74) *Attorney, Agent, or Firm*—Beyer Weaver & Thomas, LLP (57) ABSTRACT

A system and method are disclosed for providing a method of communicating between a media access control (MAC) layer and a physical (PHY) layer. The method includes sending a 100 MHz time-division multiplexed signal on a receive data line and sending a time-division multiplexed receive control signal on a receive control line. A 100 MHz time-division multiplexed signal is sent on a transmit data line and a time-division multiplexed transmit control signal is sent on a transmit control line.

33 Claims, 5 Drawing Sheets

U.S. PATENT DOCUMENTS

| | | |
|---|---|---|
| 5,920,698 A | 7/1999 | Ben-Michael et al. |
| 5,943,341 A | 8/1999 | Gazda et al. |
| 5,953,345 A * | 9/1999 | Findlater et al. ............ 370/503 |
| 5,987,023 A * | 11/1999 | Albrow et al. ............... 370/350 |
| 5,995,514 A * | 11/1999 | Lo ............................. 370/463 |
| 6,044,087 A * | 3/2000 | Muller et al. ................ 370/463 |
| 6,067,585 A * | 5/2000 | Hoang ........................ 370/11 |
| 6,069,878 A * | 5/2000 | Chritensen .................. 370/263 |
| 6,108,726 A * | 8/2000 | Runaldue et al. ........... 370/537 |
| 6,169,742 B1 * | 1/2001 | Chow et al. ................. 370/402 |
| 6,400,715 B1 * | 6/2002 | Beaudoin et al. ........... 370/392 |
| 6,704,296 B1 * | 3/2004 | Crayford et al. ............ 370/279 |
| 6,795,881 B1 * | 9/2004 | Bachrach .................... 710/100 |

* cited by examiner

REDUCED PIN COUNT MEDIA INDEPENDENT INTERFACE

CROSS REFERENCE TO RELATED APPLICATIONS

This application is related to U.S. patent application Ser. No. 09/089,033 filed on Jun. 2, 1998, now U.S. Pat. No. 5,953,345, entitled "Reduced Pin-Count 10Base-T MAC to Transceiver Interface" and co-pending U.S. patent application Ser. No. 09/088,956 filed on Jun. 2, 1998 entitled "Serial Media Independent Interface" which are incorporated herein by reference for all purposes.

BACKGROUND OF THE INVENTION

1. Field of the Invention

The present invention relates generally to a system and method for providing an interface between an Ethernet PHY and a MAC. More specifically, the present invention relates to a reduced pin count media independent interface (MII).

2. Relationship to the Related Art In computer network systems there is typically a natural division between chips handling the physical layer, which is responsible for transmitting data on the network, and the system chips, which perform logical operations with data transmitted on the network. Ethernet hubs, routers and switches are composed of multiple ports, and may be generically referred to as multi-port Ethernet devices. Each port is typically composed of a system chip, which includes a media access controller ("MAC") layer, and a physical layer or "PHY." Modern multi-port Ethernet devices typically integrate multiple MACs into one system chip (MAC chip) as well as multiple PHYs into another chip (PHY chip). An interface is required on each chip to transfer signals between the MACs and the PHYs.

IEEE standard 802.3u defines a media independent interface between a MAC layer and a PHY that includes 16 pins used for data and control. As noted above, in devices that include multiple ports that each have a MAC and a PHY, it is common to implement multiple MACs on one chip and multiple PHYs on another chip. If the standard MII, which includes 16 pins for data and control, is used for each MAC and PHY on the MAC chip and the PHY chip, the number of pins required for each chip becomes very large as multiple MACs and PHYs are included on single chips.

For example, typical switches available today may offer 24 ports in a single device. If all of the MACs were to be implemented on one chip and all of the PHYs were to be implemented on another chip then 384 pins would be required just to provide the interface between the MACs and the PHYs of the two chips. Obviously this is impractical. Thus, the requirement of 16 pins for data and control in the standard MII specification adds to the expense of MAC and PHY interfaces both by increasing the number of pins required on chips and by reducing the number of MACs and PHYs which may be combined on a single chip.

Figure 1A:
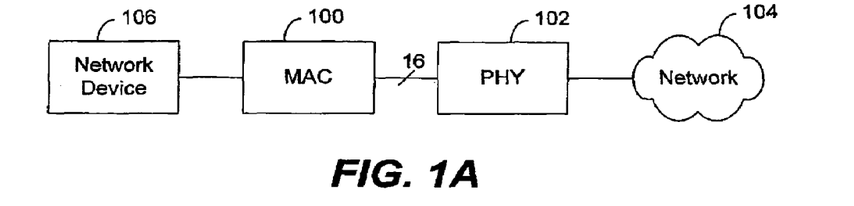
FIG. 1A is a block diagram illustrating a standard MAC to PHY interface.

FIG. 1A is a block diagram illustrating a standard MAC to PHY interface. A MAC 100 is connected to a PHY 102 via a 16 wire MII. PHY 102 is connected to a physical medium that transmits data over a network 104. MAC 100 is connected to a network device 106 in a device that is using the MAC and the PHY to communicate. The device may be a switch, a repeater, a hub or any other network device that includes ports for communication using the Ethernet 802.3u standard.

Figure 1B:
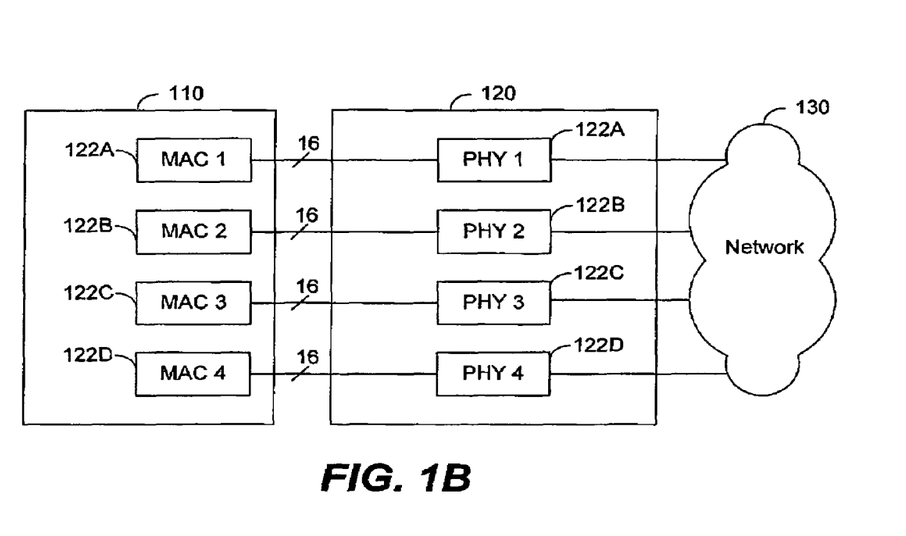
FIG. 1B is a block diagram illustrating the problem caused by the number of pins required in the standard MI MAC to PHY interface.

FIG. 1B is a block diagram illustrating the problem caused by the number of pins required in the standard MII MAC to PHY interface. A MAC chip 110 includes four MACs 112a, 112b, 112c, and 112d. Each of the four MACs must have 16 pins on the outside of the chip so that it can communicate with a PHY according to the MII standard. Similarly, a PHY chip 120 includes four PHYs 122a, 122b, 122c, 122d. Each of the PHYs must have 16 pins on the outside of the PHY chip so that it may communicate with the MAC via a standard 16 pin MII. Each PHY chip is also connected to a physical medium that is used to communicate over a network 130.

It would be extremely useful if an alternative standard to the MII standard could be developed which would allow for communication between a MAC and a PHY using a reduced number of lines between the MAC and the PHY. This would reduce the number of pins per MAC or PHY included on a chip, reduce the cost of the chip, and allow more MACs or PHYs to be included on a single chip. An alternative interface to the Mil should include all of the control signals and the same data capacity as the Mil so that such an interface could continue to be interoperable with all systems that are intended to operate with an MII as described in IEEE standard 802.3u.

Figure 2:
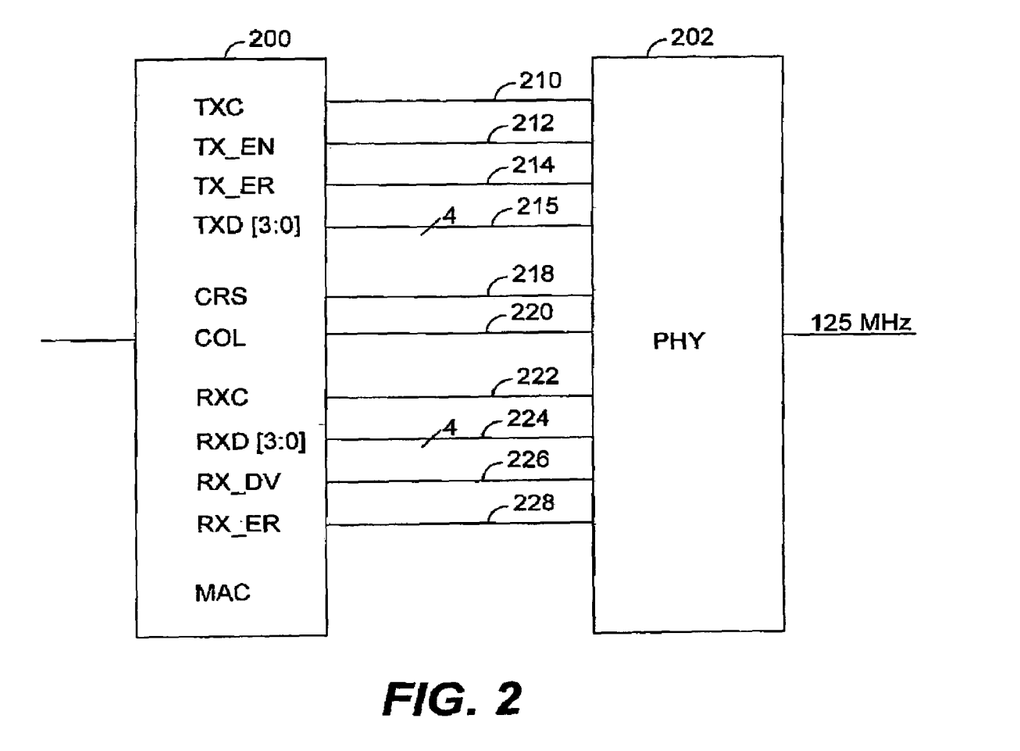
FIG. 2 is a block diagram illustrating the functions of the sixteen lines specified in the MII standard.

FIG. 2 is a block diagram illustrating the functions of the sixteen lines specified in the MII standard. A MAC 200 is connected to a PHY 202 using the 16 wire MII standard interface. The interface includes a transmit clock line 210 that provides a clock signal for clocking the transmitted data. A transmit enable line 212 indicates when data is being transmitted on the transmit data lines. A transmit error line 214 indicates an error should be forced onto the network. This line is used, for example, by repeaters to propagate errors that have been detected. A set of four lines 215 are used to transmit data. Since the overall data transfer rate between the MAC and the PHY is 100 MHz in a 100 Base-T system, each of the four data wires transmits at 25 MHz.

The MII also includes a carrier sense line 2/which indicates that data is being either received or transmitted. In addition, a collision line 220 is included which indicates that a collision has been detected, i.e., data is being both received and transmitted simultaneously. A receive clock line 222 is used to provide a clock for clocking the received data. A set of four receive data lines 224 each transfer data at 25 Mhz for an overall data rate of 100 MHz. A receive data valid line 226 indicates that valid data is being transferred on the receive data lines. A receive error line 228 indicates when an error has been detected in the received data, such as when an illegal symbol is detected by the PHY.

An MII is commonly used with a 100Base-TX PHY, for example, where data is transmitted across the physical medium of the network from PHY to PHY at a data rate of 125 MHz. Bits of data are grouped into individual symbols which include five bits each. The PHY receives each five bit symbol and translates it into a four bit nibble of data. Thus, the five bit symbol is used to transmit only four bits of data, with the remaining possible information states of the symbol used for error detection or other purposes. When errors are detected by the PHY, they are propagated to the MAC using the receive error line. Certain devices, such as repeaters, may use the transmit error line to propagate errors to other devices on a network. It should be noted that the receive data valid line differs from the carrier sense line in that the receive data valid line does not go high as soon as data begins to be received. Instead, the receive data valid line goes high after an entire five bit symbol corresponding to a nibble of valid data has been received and decoded, and remains high after data has stopped being received between PHYs to allow decoding of all four bits of the nibble corresponding to the last symbol transmitted. MIIs may also be used to connect a MAC to another type of PHY, such as a 100Base-T4 PHY using other data transfer formats.

One approach to reducing the number of pins required for the MAC to PHY interface has been proposed by the Reduced Media Independent Interface™ (RMII™) consortium. The RMII provides a six pin interface between a MAC and a PHY. In addition to the six wires required for each MAC to PHY interface, a single synchronous clock signal is provided for both transmit data sent from the MAC to the PHY and the receive data sent from the PHY to the MAC. In the six pin RMII, two pins are used to transmit data and two pins are used to receive data. Each of the data transmit and the data receive lines runs at 50 Mhz. This provides a total bandwidth of 100 MHz for sending and a 100 MHz for receiving data across the MAC to PHY interface.

Thus, the RMII reduces the number of pins required to transmit and receive data from eight to four by doubling the clock speed of the data lines. The RMII reduces the eight pins required to send the remaining six control signals to only two pins by combining certain control signals and deriving other control signals in the manner described below. The transmit clock and the receive clock lines are eliminated for each individual MAC to PHY interface because a single synchronous clock is used for all of the interfaces on a single chip. The remaining six control signals are combined and derived from only two control lines as is described below.

The carrier sense and receive data valid control signals are combined on a single line by the RMII. As described above, the carrier sense signal differs from the receive data valid single in that the carrier sense signal goes high as soon as the PHY begins to receive data. The receive data valid signal goes high only after the PHY has received the first complete symbol of data and decoded the first nibble of data. Also, the receive data valid symbol remains high until the last nibble corresponding to the last symbol has been transferred to the MAC. The RMII combines the two signals into one on a single line as follows: the combined signal asserts with carrier sense and remains asserted while both carrier sense and receive data valid are both asserted. The signal alternates between the asserted and deasserted state while carrier sense is not asserted, but receive data valid is still asserted, so that carrier sense and received data valid are time-division multiplexed. The signal becomes deasserted while both carrier sense and receive data valid are deasserted.

On the second and last control line provided by the RMII, a transmit enable signal is provided. The collision signal is derived from the transmit enable signal and the carrier sense portion of the carrier sense data valid signal. When both are asserted, the RMII determines that a collision has occurred. The last two control signals, the receive error signal and the transmit error signal are transferred across the interface by altering the data sent when an error is detected. When an illegal symbol is detected, the rest of the data is filled with a specific data pattern such as alternating ones and zeros. When the specific data pattern is read, then it is determined that an error has occurred. There is a finite probability that good data may match the specific data pattern causing the MAC's to determine that an error has occurred when, in fact, no error has occurred. However, the RMII is designed so that the probability of such mistakes occurring is acceptably small to the system designers.

It should also be noted that the IEEE MII specification requires backward compatibility with a 10base-T Ethernet interface so that data may be transferred between the MAC and the PHY at either 100 Mhz or 10 Mhz. When data is transmitted at 10 Mhz, then each bit is repeated ten times so that the 10 Mhz data may be recovered by sampling every tenth bit. It is necessary, therefore, to indicate to the MAC or the PHY whether data is being transmitted at 100 Mhz or 10 Mhz so that proper sampling of the data may be implemented. The RMII accomplishes determining the correct data rate by using an out-of-band communication between the MAC and the PHY. The MAC queries a designated PHY register using the MII management bus to determine the selected data rate. It would be useful if an alternative to this out-of-band communication could be developed since the out-of-band communication is slow and there is a possibility that the out-of-band communication may not be accomplished before data is transmitted.

In view of the foregoing, it would be useful if the number of wires between a MAC and a PHY could be even further reduced to less than six wires. Furthermore, it would be useful if a simpler method of combining the control signals on a control line could be developed.

SUMMARY OF THE INVENTION

Accordingly, the present invention provides a reduced pin count Mini-MI interface that requires only four wires for the interface between a MAC and a PHY. The Mini-MII interface includes four lines, a transmit data line, a transmit control line, a receive data line, and a receive control line. The transmit data line, the transmit control line, the receive data line and the receive control line run at 100 Mhz. All of the data may be transferred across the data lines. The transmit control line conveys the transmit enable and transmit error information using time-division multiplexing. The receive control line conveys the receive data valid, receive error and carrier sense control information using time-division multiplexing. Furthermore, the transmit error and receive error signals are provided without requiring the data to be altered and interpreted. The transmit control and receive control lines are used to synchronize the time-division multiplexed data. The speed at which the PHY is transferring data to the MAC is indicated on the receive data line when the receive control line sends a certain bit pattern. Therefore, no out-of-band communication is required between the MAC and the PHY to determine whether the PHY is sending a data stream to the MAC at 10 Mbit/sec or 100 Mbit/sec.

It should be appreciated that the present invention can be implemented in numerous ways, including as a process, an apparatus, a system, a device, or a method. Several inventive embodiments of the present invention are described below.

In one embodiment, a method of communicating between a MAC and a PHY includes sending a 100 MHz time-division multiplexed signal on a receive data line and sending a time-division multiplexed receive control signal on a receive control line. A 100 MHz time-division multiplexed signal is sent on a transmit data line and a time-division multiplexed transmit control signal is sent on a transmit control line. In another embodiment, an interface between a first MAC and a second MAC consists essentially of a time-division multiplexed receive data line, a time-division multiplexed receive control line, a time-division multiplexed transmit data line and a time-division multiplexed transmit control line. In another embodiment, a MAC to PHY interface consists essentially of a common clock, a time-division multiplexed receive data line, a time-division multiplexed receive control line, a time-division multiplexed transmit data line and a time-division multiplexed transmit control line.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 3:
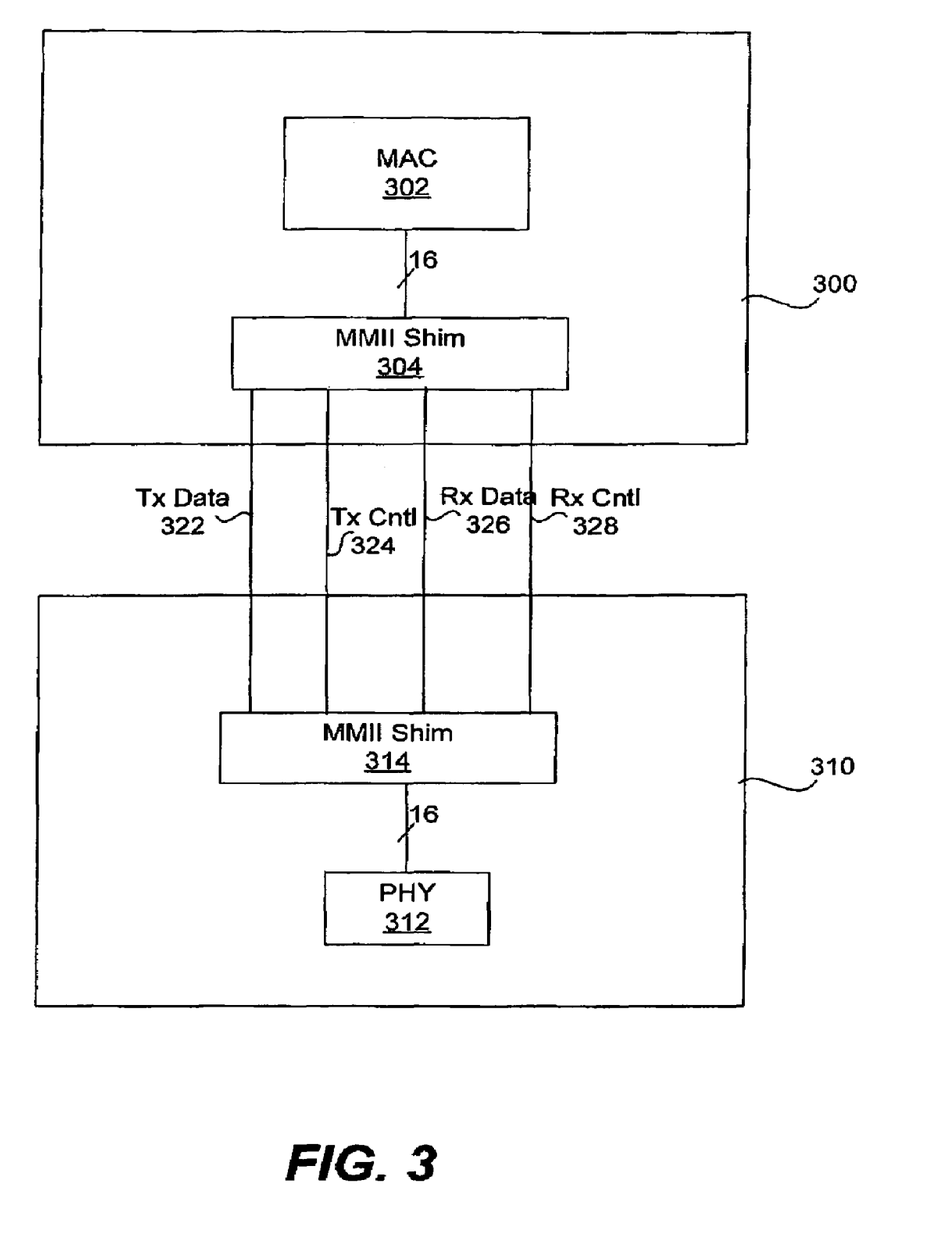
FIG. 3 is a block diagram illustrating how Mini-MII ("MMII") designed according to the present invention is used between a chip containing a MAC and a chip containing a PHY.

FIG. 3 is a block diagram illustrating how Mini-MII ("MMII") designed according to the present invention is used between a chip 300 containing a MAC 302 and a chip 310 containing a PHY 312. The sixteen standard MII lines from MAC 302 are connected to an MMII shim 304 which converts the data signals and the control signals on the sixteen lines to MMII signals that are conveyed across four lines. The four MMII lines include a transmit data line 322, a transmit control line 324, a receive data line 326, and a receive control line 328. These lines are connected to an MMII shim 314 on PHY chip 310 that converts the signals on those lines to the signals on a standard sixteen wire MII interface to PHY 312. It should be noted that in FIG. 3 the MMII interface is shown as a shim between a standard MII interface and a MAC or PHY. In certain embodiments the MMII is implemented as a shim and in other embodiments, the MMII is implemented directly as part of the MAC or the PHY without translating signals to an actual 16 wire MII interface. The MMII provides a reduced number of wires for communication between the MAC and the PHY.

The MMII Receive Path

Figure 4:
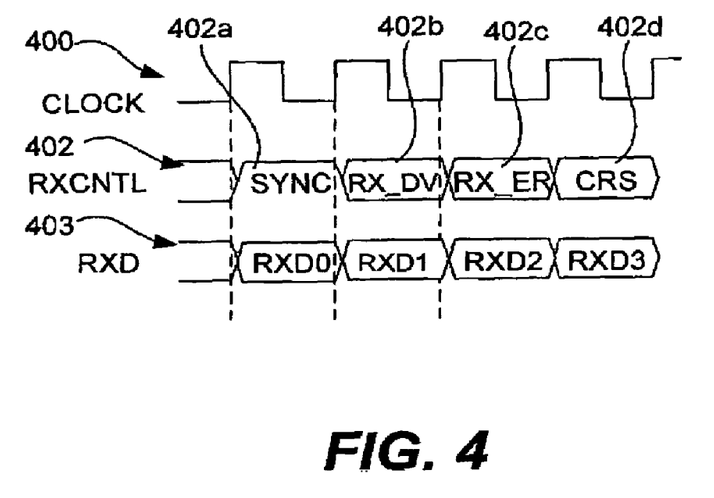
FIG. 4 is a sequence diagram illustrating how data and control are transferred using the receive data and receive control lines.

The MII receive path includes the receive data line and the receive control line. Receive data and control information are signaled in four bit segments. The data rate is one bit per 100 MHz clock cycle. In 100 Mbit/sec mode, each segment represents a new nibble of data. In 10 Mbit/sec mode, each segment is repeated ten times so every ten segments represents a new nibble of data. The MAC samples one of every ten segments when data is sent in 10 Mbit/sec mode. FIG. 4 is a sequence diagram illustrating how data and control are transferred using the receive data and receive control lines. A reference clock signal 400 is shown. In one embodiment, a common reference clock signal is used by both the MAC and the PHY chip. In order to send data to the MAC on the receive line that is synchronous to the MAC reference clock, the PHY must pass the data through an elasticity FIFO buffer to handle any difference between the reference clock rate and the clock rate at the packet source.

The Ethernet specification calls for packet data to be referenced to a clock with a frequency tolerance of 0.01%. However, it is not uncommon to encounter Ethernet stations with clocks that have frequency errors up to 0.1%. Thus, it is preferable that a FIFO be designed which allows communication with an end station that has a frequency error of up to 0.1% instead of the 0.01% required by the standard. Accordingly, the present invention in one embodiment provides an elasticity FIFO that is at least twenty-seven bits long. The size of the FIFO is determined according to the following formula:

# of bits=2*(max frame in bits)*(end station error+ local error)=2*(1518*8)*(0.1%+0.01%)=26.7 bits A receive control signal 402 is time-division multiplexed to include each of the MII receive control signals in a four bit segment. The first segment 402a is a sync pulse. The sync pulse is always a one and it is used to synchronize the MAC to the data stream. The MAC monitors the received control signal and looks for a one followed by three zeros. A one followed by three zeros indicates that data is not being transferred from the PHY but the 1000 pattern can be used by the MAC to determine the beginning of the four bit segment. The remaining three bits in each receive control signal segment correspond to the IEEE MII receive control signals. These include a receive data valid signal 402b, a receive error signal 402c, and a carrier sense signal 402d. Thus, the receive control line contains all of the information found on the receive side of the standard MII.

A receive data signal 403 is shown. The received data signal has four bits in each segment. The four bits are synchronized to the four control bits in the receive control signal. As described above, the MAC is able to synchronize to the beginning of the four bit control segment by monitoring the receive control line and looking for the 1000 pattern. Once the MAC is synchronized to the MMII control stream, the three control bits, RX_DV, RX_ER and CRS, and the four data bits, RXD0, RXD1, RXD2 and RXD3, have the same purpose as the commonly designated signals in MII.

When receive data valid is zero, receive error is zero, and carrier sense is zero, the four bit receive control signal segment is 1000. The MAC can then synchronize to the 1 as being the first bit in the four bit segment. In addition, in one embodiment, when the 1000 pattern is received on the control line, the received data line is used to convey the PHY status. In one embodiment, when a 1000 is received on the receive control line, the first bit of the data segment is used to indicate the speed of the interface with a zero indicating 10 Mbits/sec and a 1 indicating 100 Mbits/sec. The other three bits in the data segment may be used to convey other data about the PHY status. In one embodiment, the second bit is used to indicate duplex with a zero indicating half and a one indicating full. The third bit is used to indicate whether the link is up or down with a zero indicating down and a one indicating up. The fourth bit is used to indicate jabber with a zero indicating okay and a 1 indicating an error. In other embodiments, the bits may be used for other signals. Also, the order of the bits may be changed.

Thus, it has been shown that all of the control signals and the data provided by the MII interface from the PHY to the MAC are included in the time-division multiplexed receive control and receive data lines of the Mini-MII interface. Next, it will be shown that the control signals and data from the MAC to the PHY are all included in the transmit control line and the transmit data line of the Mini-MII interface.

The MMII Transmit Path

Figure 5:
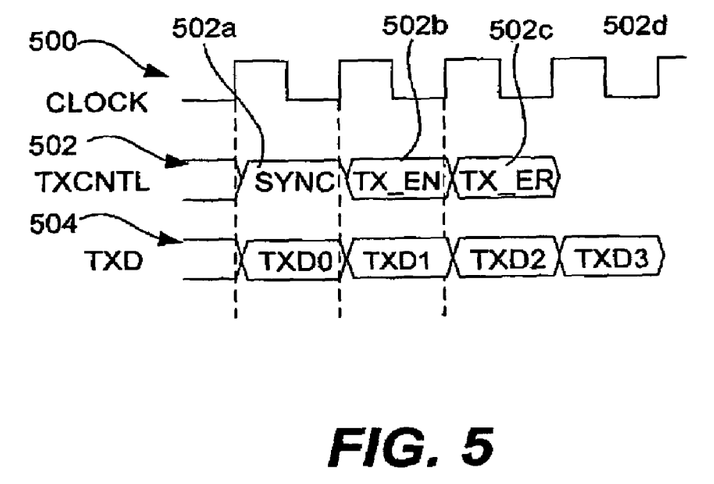
FIG. 5 is a sequence diagram illustrating how data and control are transferred on the transmit data and transmit control lines.

FIG. 5 is a sequence diagram illustrating the signals on the transmit control and transmit data lines of the Mini-MII. Just as in the receive path, transmit data and control information are signaled in four bit segments. A clock signal 500 is provided by a clock source. In one embodiment, the clock source for the MAC and the PHY is a common clock. Thus, for each MAC and PHY chip a single pin is required to provide a clock for all of the MAC's or Phy's included on the chip. In other embodiments, a clock may be internally generated on a MAC or PHY chip. The data rate is 1 bit/100 MHz clock cycle.

Control signals and data are transmitted in 4 bit segments. In 100 Mbit/sec mode, each segment represents a nibble of data. In 10 Mbit/sec mode, each segment is repeated 10 times so that every ten segments represents a new nibble of data and the PHY can sample 1 of every 10 segments in 10 Mbit mode. A transmit control signal 502 contains the transmit control information provided on the transmit side of the standard MII. The transmit control segment contains a sync pulse 502a, a transmit enable signal 502b and a transmit error signal 502c. The fourth bit in the transmit control segment is not needed to provide standard MII information. In one embodiment it is held at zero in other embodiments it may be used to convey other information from the MAC to the PHY.

As on the receive path, a 1000 pattern on the transmit control segment is used by the PHY to synchronize to the data stream, with the 1 generated by the sync pulse being used to mark the beginning of the segment. Once the PHY is synchronized to the MII data stream, when the transmit enable bit goes high, the PHY can sample data on a transmit data line 504. Transmit data line 504 includes four bits per segment which are time-division multiplexed, just as the receive data line.

It is generally not necessary to pass status information from the MAC to the PHY because the PHY is able to detect the data rate. Therefore, in one embodiment, no status information is passed using the transmit data line in a manner that status information is passed using the receive data line. However, in other embodiments, this may be done if desired.

Collisions are detected when the transmit enable signal and the carrier sense signal are both high. For this method of detecting collisions to work, the PHY must ensure that CRS is not affected by its transmit path. When transmit enable is high and carrier sense is asserted, then a collision has occurred.

Synchronization Process

Figure 6:
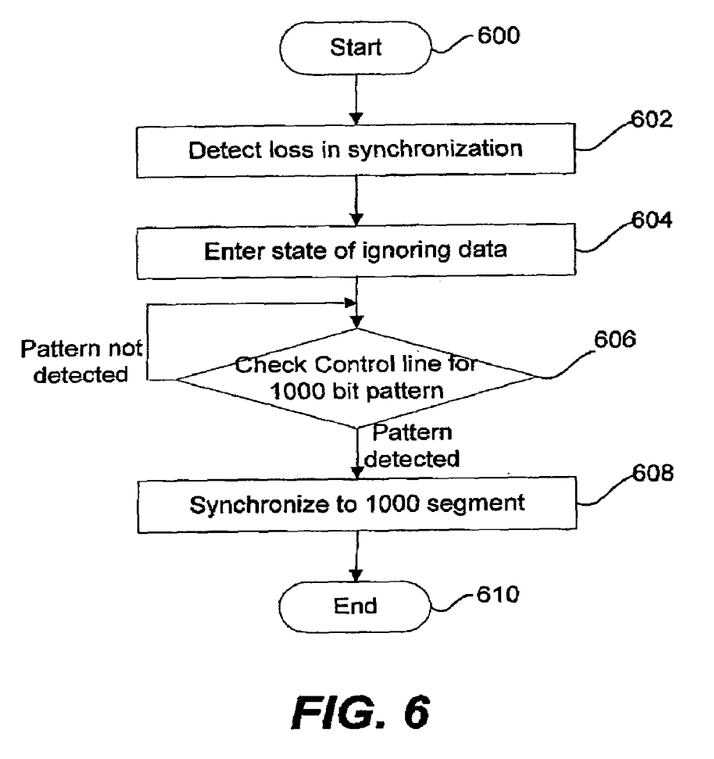
FIG. 6 is a flow chart illustrating how a MAC that is receiving data synchronizes to the first bit of a four bit data segment using the pattern transferred (or received) on the receive control line.

FIG. 6 is a flow chart illustrating how a MAC that is receiving data synchronizes to the first bit of a four bit data segment using the 1000 pattern transmitted on the receive control line. A similar process is implemented on the PHY to synchronize to the first bit of a transmit data segment using the transmit control bit pattern 1000. The process starts at 600. In a step 602, the MAC or PHY device detects a loss in synchronization. The device then enters a state of ignoring data in a step 604. In a step 606, the device checks the control line for a 1000 pattern. When the pattern is detected, control is transferred to a step 608 and the device synchronizes to the beginning of the 1000 segment. The process then ends at 610 and the process is executed again if another loss in synchronization is detected.

Figure 7:
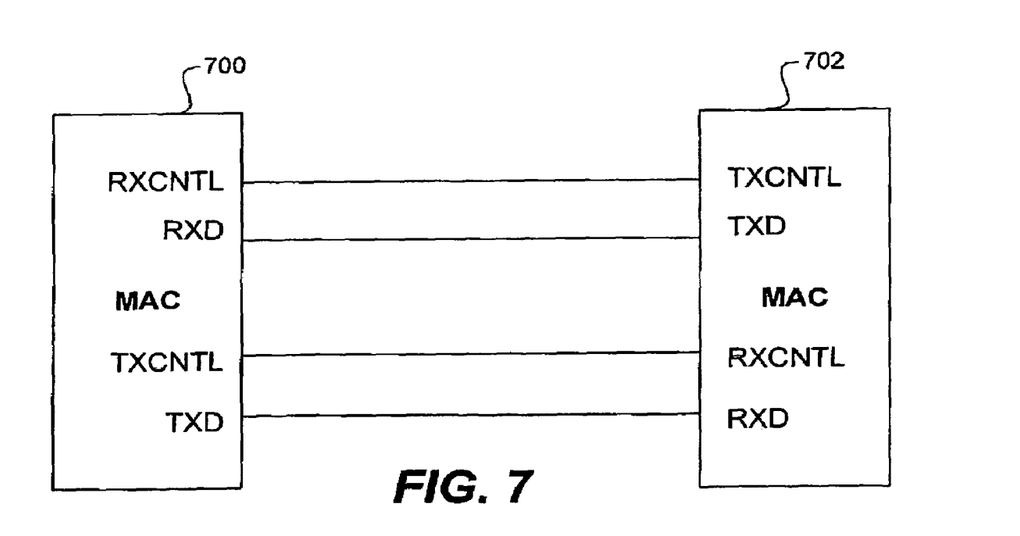
FIG. 7 is a block diagram illustrating how the four wires of the MMII are connected between a first MAC and a second MAC.

In addition to being used as a MAC to PHY interface, the MMII may also be used as a full duplex link to connect two MAC's directly. FIG. 7 is a block diagram illustrating how the four wires of the MMII are connected between a first MAC 700 and a second MAC 702. The receive control line and the transmit data line of MAC 700 are connected to the transmit control line and the transmit data line of MAC 702, respectively. The transmit control line and the transmit data line of MAC 700 are connected to the receive control line and receive data line of MAC 702, respectively. The receive control and transmit control segments have nearly a bit to bit correspondence. The sync signal sent from one MAC can be used as a sync signal by the other MAC. The transmit enable signal sent from one MAC can be interpreted as a received data valid signal by the other MAC and the transmit error signal from one MAC can be used as a receive error signal by the other MAC. The fourth bit in the transmit control segment sent from one MAC is always deasserted and can be interpreted as a carrier sense by the other MAC.

Status information is included in the transmit path when transmit enable and transmit error are both zero. The first bit of the transmit data line is used to indicate speed, with zero indicating 10 Mbits/sec and 1 indicating 100 Mbits/sec. The second bit indicates duplex mode with 1 indicating full duplex. The third bit indicates link status with 1 indicating that the link is up and the fourth bit indicates jabber with a zero indicating no jabber. In other embodiments, these conventions may be changed. When transmit enable is 1, then the information on the transmit data segment is interpreted as being an MII data nibble. When the transmit error bit is 1, then the information on the transmit data segment is assumed to be an error.

Thus, it has been shown that a four wire Mini-MII interface using time-division multiplexed control and data signals can be used to convey all of the data and control information transferred by the standard IEEE MII interface. A common clock signal is used for both the MAC and the PHY and the time-division multiplexed segments are synchronized using a synchronization pulse on the receive control and the transmit control lines. Thus, the number of wires required for a MAC to PHY interface can be reduced, enabling more MAC's or Phy's to be implemented on a single chip.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. For example, the Mini-MI interface can be used with other physical layers. Accordingly, the present embodiments are to be considered as illustrative and not restrictive, and the invention is not to be limited to the details given herein, but may be modified within the scope and equivalents of the appended claims.

What is claimed is:

1. A method of communicating between a media access control layer (MAC) and a physical layer (PHY), comprising:
   receiving a first time-division multiplexed signal on a receive data pin;
   receiving a plurality of time-division multiplexed receive control signals on a single receive control pin;
   sending a second time-division multiplexed signal on a transmit data pin;
   sending a plurality of time-division multiplexed transmit control signals on a single transmit control pin,
   wherein the receive control signals include a receive data valid signal and a receive error signal time-division multiplexed together on the single receive control pin and the transmit control signals include a synchronization (SYNC) signal a transmit enable signal and a transmit error signal time-division multiplexed together on the single transmit control pin.

2. The method of claim 1 wherein the time-division multiplexed receive control signals includes a plurality of 4 bit segments and wherein each 4 bit segment includes a synchronization bit.

3. The method of claim 2 wherein the beginning of each 4 bit segment of the receive control signals is determined by the synchronization bit of such each 4 bit segment.

4. The method of claim 1 wherein the time-division multiplexed receive control signals includes a plurality of 4 bit segments and wherein each 4 bit segment includes a receive data valid bit.

5. The method of claim 1 wherein the time-division multiplexed receive control signals includes 4 bit segments and wherein each 4 bit segment includes a receive error bit.

6. The method of claim 1 wherein the time-division multiplexed receive control signals includes a plurality of 4 bit segments and wherein each 4 bit segment includes a carrier sense bit.

7. The method of claim 1 when the time-division multiplexed transmit control signals includes a plurality of 4 bit segments and wherein each 4 bit segment includes a synchronization bit.

8. The method of claim 7 where the beginning of each 4 bit segment is determined by the synchronization bit of such each 4 bit segment.

9. The method of claim 1 wherein the time-division multiplexed transmit control signals includes a plurality of 4 bit segments and wherein each 4 bit segment includes a transmit enable bit.

10. The method of claim 1 wherein the time-division multiplexed transmit control signals includes a plurality of 4 bit segments and wherein each 4 bit segment includes a transmit error bit.

11. The method of claim 1 further including indicating the peed of the PHY using the receive data pin.

12. The method of claim 11 wherein indicating the speed of the PHY using the receive data pin includes including an interface speed bit in a data segment when a receive control segment indicates no carrier sense, no receive data valid and no receive error.

13. The method of claim 1 further including buffering data transmitted from the PHY to the MAC using an elasticity buffer that is at least 27 bits long.

14. The method of claim 1 further including buffering data transmitted from the PHY to the MAC using an elasticity buffer that long enough to buffer an entire frame of data from a data source having a clock with a frequency tolerance of 0.1%.

15. An interface between a first media access control layer and a second media access control layer, comprising:
   a time-division multiplexed receive data pin;
   a time-division multiplexed receive control pin for receiving different functional types of receive control signals including a receive data valid signal and a receive error signal that are time-division multiplexed together on the receive control pin;
   a time-division multiplexed transmit data pin; and
   a time-division multiplexed transmit control pin for transmitting different functional types of transmit control signals including a synchronization (SYNC) signal, a transmit enable signal and transmit error signal that are time-division multiplexed together on the transmit control pin.

16. A media access control layer to physical layer interface comprising:
   a common clock;
   a time-division multiplexed receive data pin;
   a time-division multiplexed receive control pin for receiving different functional types of receive control signals including a receive data valid signal and a receive error signal time-division multiplexed together on the receive control pin;
   a time-division multiplexed transmit data pin;
   a time-division multiplexed transmit control pin for transmitting different functional types of transmit control signals including a synchronization (SYNC) signal, a transmit enable signal and a transmit error signal time-division multiplexed together on the transmit control pin.

17. The interface of claim 16, wherein said time-division multiplexed receive control pin contains receive control signals further comprising a carrier sense signal and a synchronization (SYNC) signal.

18. The method of claim 1, wherein the receive control signals further include a synchronization (SYNC) gal and a carrier sense signal.

19. The interface of claim 15, wherein the receive control signals include a plurality of 4 bit segments and wherein each 4 bit segment includes a synchronization bit.

20. The interface of claim 19 wherein the beginning of each 4 bit segment of the receive control signals is determined by the synchronization bit of such each 4 bit segment.

21. The interface of claim 15 wherein the receive control signals include a plurality of 4 bit segments and wherein each 4 bit segment includes a receive data valid bit.

22. The interface of claim 15 wherein the receive control signals includes 4 bit segments and wherein each 4 bit segment includes a receive error bit.

23. The interface of claim 15 wherein the receive control signals includes a plurality of 4 bit segments and wherein each 4 bit segment includes a carrier sense bit.

24. The interface of claim 15 wherein the trait control signals includes a plurality of 4 bit segments and wherein each 4 bit segment includes a synchronization bit.

25. The interface of claim 24 wherein the beginning of each 4 bit segment is determined by the synchronization bit of such each 4 bit segment.

26. The interface of claim 15 wherein the transmit control signals includes a plurality of 4 bit segments and where each 4 bit segment includes a transmit enable bit.

27. The interface of claim 15 wherein the transmit control signals includes a plurality of 4 bit segments and wherein each 4 bit segment includes a transmit error bit.

28. The interface of claim 15 wherein the receive data pin is further arranged to indicate the speed of the PRY.

29. The interface of claim 28 wherein the receive data pin is arranged to indicate the speed of the PHY by including an interface speed bit in a data segment when a receive control segment indicates no carrier sense, no receive data valid and no receive error.

30. The interface of claim 15 further comprising an elasticity buffer that is at least 27 bits long for buffering data transmitted from the PHY to the MAC.

31. The interface of claim 15 further including an elasticity buffer that is long enough to buffer an entire frame of data from a data source hang a clock with a frequency tolerance of 0.1% and is arranged to buffer data transmitted from the PHY to the MAC.

32. The interface of claim 15, wherein the receive control signals further include a synchronization (SYNC) signal and a carrier sense signal.

33. An apparatus communicating between a media access control layer (MAC) and a physical layer (PHY), comprising:
  means for receiving a first time-division multiplexed signal on a receive data pin;
  means for receiving a plurality of time-division multiplexed receive control signals on a single receive control pin;
  means for sending a second time-division multiplexed signal on a transmit data pin;
  means for sending a plurality of time-division multiplexed it control signals on a single transmit control pin,
  wherein the receive control signals include a receive data valid signal and a receive error signal time-division multiplexed together on the single receive control pin and the transmit control signals include a synchronization (SYNC) signal, a transmit enable signal and a transmit error signal time-division multiplexed together on the single transmit control pin.

* * * * *